United States Patent Office 3,388,062
Patented June 11, 1968

3,388,062
CUTTING FLUIDS FOR MACHINING AND/
OR WORKING OF TITANIUM AND ITS
ALLOYS
Robert L. Vaughn, Granada Hills, Calif., assignor to
Lockheed Aircraft Corporation, Burbank, Calif.
No Drawing. Continuation-in-part of application Ser. No.
394,319, Sept. 3, 1964. This application Jan. 27, 1967,
Ser. No. 612,106
3 Claims. (Cl. 252—33.4)

ABSTRACT OF THE DISCLOSURE

A cutting fluid principally for machining titanium and its alloys which may be either oil base or an emulsion and utilizes as the active ingredient a metallic petroleum sulfonate selected from the group of barium, calcium, magnesium and aluminum sulfonates.

---

This is a continuation-in-part application of Ser. No. 394,319 filed Sept. 3, 1964, now abandoned.

This invention relates to cutting fluids and more particularly to cutting fluids for titanium and titanium alloys.

Difficulties encountered in machining of titanium are well-known. Conventional cutting fluids have not proven to be satisfactory for machining of the titanium alloys. Heretofore, because of the relatively small amounts of titanium utilized in industry, the high cost of machining has not been too significant. However, as the use of titanium and titanium alloys becomes more extensive, machining costs are more significant.

It will be understood that the titanium alloys referred to in the description have the following approximate composition:

| Alloy: | Aluminum | Tin | Chrome | Vanadium | Titanium |
|---|---|---|---|---|---|
| A-110 | 5 | 2.5 | | | 92.5 |
| B-120 | 3 | | 11 | 13 | 73.0 |

Another major disadvantage in the use of many conventional cutting fluids is the danger of stress corrosion and/or embrittlement problems with their residual effects. For example, cutting fluids containing chlorine additives generally produce cracking or surface checking in all of the titanium alloys during subsequent operations.

Cutting fluids, to be effective, must assist in the machining operation of providing an acceptable finished surface by washing away the chips and serve as a lubricant and coolant to prolong the cutting tool life and lower the cost of metal removal. Additional and desirable characteristics of an effective cutting fluid are a lack of residual gumminess, non-toxicity, no disagreeable odor, machine operator acceptance and lack of physiological reactions. Also, the cutting fluid should not lift, blister, soften or have any detrimental effects on machine tool enamel.

An object of this invention is to provide improved cutting fluids for high-speed machining of the titanium alloys, including boring, drilling, tapping, etc.

A further object of the invention is to provide cutting fluids which will substantially lower the cost of machining the titanium alloys.

A further object of the invention is to provide a clear, clean cutting fluid of outstanding characteristics on even "aged" space age type titanium alloys.

These and other objects will become more apparent from the following detailed description of the invention.

Commonly used cutting fluids are: water, water solutions or emulsions of detergents and oils; mineral oils; fatty oils; chlorinated mineral oils; sulfurized mineral oils and mixtures of the foregoing. While some of these conventional fluids are utilized for machining the titanium alloys, the cost of metal removal is high with a limited cutting tool life. Machining of titanium using the cutting fluids of this invention have resulted in a 40% to 60% increase in metal removal rate as compared to standard fluids, with a 25% to 50% reduction in the cost of metal removal. Tool life when using the new fluids has increased considerably from about 30% at the lower cutting speeds to around 300% to 400% at the higher cutting speeds.

A comprehensive study of cutting fluids was made to determine which cutting fluid or fluids would provide the best rate of metal removal with reasonable tool life and lowest cost for machining titanium alloys. This investigation consisted of an evaluation of 73 different cutting fluids which included oil base, water soluble oil and water soluble chemical cutting fluids. A total of 103 screening tests were made under controlled conditions on A-110 titanium using various dilutions and/or mixtures of the cutting fluids with high-speed steel end mills.

Extended life tests with high-speed steel end mills were made on both A-110 and B-120 titanium alloys using the cutting fluids which appeared best from the initial evaluation. Chemical additives for cutting fluids were also evaluated to determine their effectiveness in machining of titanium alloys.

All cutting fluid tests were made on a Kearney and Trecker, TF-430, Horizontal Milling Machine. Each test was made under the same cutting conditions with a new 1.0" diameter, M-10 high-speed steel, 4 flute end mill. The geometry of each test cutter was carefully checked to make certain that tool geometry did not change from test to test.

It was discovered that an improved cutting oil for titanium alloys may be produced by mixing oil soluble metal sulfonates in water emulsions or in oil. For example, commercial barium sulfonate is mixed with pale oil (neutral blending oil), and applied to the cutter and work in the conventional manner. Calcium, aluminum and magnesium sulfonates also provide outstanding results. It should be noted that sulfurization and/or chlorination, previously used in the preparation of cutting fluids has been eliminated.

One suitable method of preparing barium petroleum sulfonate is as follows:

100 pounds of a 62% sodium sulfonate (derived from manufacture of mineral white oils) is placed in a steam jacketed kettle equipped with an agitator.

100 pounds of diluting oil, usually an oil with a Saybolt viscosity of 100 seconds at 100° F. is introduced into the kettle and the mixture is heated to approximately 160° F. with agitation until a clear blend is obtained. To the clear blend 8 gallons of a 15% aqueous barium chloride solution is added in a thin, continuous stream while agitating and maintaining the temperature at about 190° F.

The agitation is continued at 190° F. for two hours, after which the temperature is raised to 220° F., the agitation stopped and the material is left to settle at a temperature of 195° F. After approximately two hours, there is a separation into a clear, oily layer at the top and a clear water layer at the bottom. The clear water layer is drawn off. The top layer is then given one wash with water (60% by volume of the oil layer) while agitating at 190° F. for about one hour. The temperature is again raised to 220° F., agitation is stopped and the material is left to settle overnight at about 190° F. In the morning, after withdrawing the settled clear water layer, the top oily layer is dehydrated by heating to 220° F., using mechanical agitation, and air blowing to insure complete dehydration.

The resulting product has the following typical composition in weight percent:

| | Percent |
|---|---|
| Barium sulfonates (percent barium—14.5) | 44 |
| Mineral oil | 55.5+ |
| Water | Nil |
| Inorganic salts | <½ of 1 |

Oil solutions of the above product in volume concentrations of 5% to 40% have proved very effective as a cutting fluid. In the specification and claims the terms "oil soluble petroleum sulfonate" and/or "barium petroleum sulfonate" shall be understood to mean an oil soluble metallic sulfonate in an oil solution as exemplified by the above typical product. The following is an example of emulsion utilizing the barium petroleum sulfonate as described above for preparation of water solutions.

EXAMPLE I.—EMULSION

| | Percent, by volume |
|---|---|
| Barium petroleum sulfonate | 5–20 |
| Anionic surfactant (sodium petroleum sulfonate) | 20 |
| Glycol coupler | 1 |
| Pale oil (neutral blending oil) | 59–74 |

This solution is then mixed with water. A concentration of 1 part by volume of the fluid of Example I and 10 parts by volume of water is preferred and provides the best fluid for over-all machining.

The petroleum sulfonates utilized in the cutting fluids in accordance with the invention may also be made as by-products of white oil manufacturing by treating the sulfonic acid sludge with the hydroxide of the selected metal. The resulting metallic petroleum sulfonates have the following concentrations by weight:

| | Percent |
|---|---|
| Barium sulfonate (percent barium—14.5) | 44 |
| Calcium sulfonate (percent calcium—15) | 55 |
| Magnesium sulfonate (percent magnesium—15) | 55 |
| Aluminum sulfonate (percent aluminum—15) | 55 |

Another source of barium sulfonate has a concentration of 67% (barium—22½%) which is preferred where emulsions are used having a dilution with water higher than the 10:1 mixture referred to above. However, for optimum machining, the concentration of the oil soluble petroleum sulfonate should fall within the range of about 2% and 35% for the oil solutions and within the range of about .2% and 1% for the water and oil emulsions. It is to be understood that these ranges are based on the assumption that the barium, calcium, magnesium or aluminum is approximately 15% of the corresponding sulfonate. Lower concentrations require frequent replenishment by addition of the particular sulfonate, whereas higher concentrations provide little noticeable increase in metal removal.

As an illustration of the unique and clearly unobvious characteristics of the cutting fluids according to this invention a comparison was made between the fluid of Example I and a commercially available fluid of the following composition:

| | Percent |
|---|---|
| Moly disulfide | 5 |
| Anionic surfactant (petroleum sulfonate) | 20 |
| Glycol coupler | 1 |
| Pale oil (neutral blending oil) | 74 | which is identical in all respects except that instead of 5% barium sulfonate, the other fluid contains 5% moly disulfide. For the same tool wear and when machining alloy A–110, the commercial fluid provided a work travel of 23 inches, whereas the fluid of Example I provides a travel of well over 800 inches.

Extensive testing was done to substantiate the cutting capabilities of the fluids according to the present invention. The following results are all based on carefully controlled conditions. The tests covered both slotting and pocketing cuts, the width (radial depth) of the cut and the depth (axial depth) of the cut being variable as indicated. In each instance the run was made using 10 or more cutting fluids to determine the tool life in lineal inches of work travel before a wear of .015 inch was noted on 3 teeth of the cutting tool which was a 1.0 inch diameter, M–10 high-speed steel, 4 flute end mill. The fluid made in accordance with the invention are compared in each instance with the commercial fluid giving the best results in each run, for the indicated cutting speed, feed and cut dimensions. The barium sulfonate in each instance is the solution of Example I diluted one to ten (1:10) by volume in water.

WATER EMULSIONS

Test Run 1

Titanium alloy A–110, stress relieved; slotting cut; cutting speed 33 ft./min.; feed .0063 in./tooth; axial depth—1.0"; radial depth—1.0".

| Cutting fluid: | Work travel in inches |
|---|---|
| Barium sulfonate | [1] 800 |
| Commercial fluid A (water soluble) | 271 |

[1] Test stopped—.012" wear on cutter.

Test Run 2

Titanium alloy A–110, stress relieved; pocketing cut; cutting speed 88 ft./min.; feed .0097 in./tooth; axial depth—2.0"; radial depth—.060".

| Cutting fluid: | Work travel in inches |
|---|---|
| Barium sulfonate | 1000 |
| Commercial fluid B (water soluble) | 611 |
| Commercial fluid A (water soluble) | 180 |

Test Run 3

Titanium alloy A–110, stress relieved; pocketing cut; cutting speed 117 ft./min.; feed .0088 in./tooth; axial depth—2.0"; radial depth—.030".

| Cutting fluid: | Work travel in inches |
|---|---|
| Barium sulfonate | 1953 |
| Commercial fluid C (water soluble) | 1040 |
| Commercial fluid B (water soluble) | 940 |
| Commercial fluid A (water soluble) | 908 |

Test Run 4

Titanium alloy B–120, aged; slotting cut; cutting speed 18 ft./min.; feed—.0055 in./tooth; axial depth—1.0"; radial depth—1.0".

| Cutting fluid: | Work travel in inches |
|---|---|
| Barium sulfonate | 115 |
| Commercial fluid D (water soluble) | 86 |

Test Run 5

Titanium B–120, aged; pocketing cut; cutting speed 25 ft./min.; feed—.007 in./tooth; axial depth—1.0"; radial depth—.250".

| Cutting fluid: | Work travel in inches |
|---|---|
| Barium sulfonate | 372 |
| Commercial fluid D (water soluble) | 245 |

Test Run 6

Titanium B–120; aged; pocketing cut; cutting speed 63 ft./min.; feed .0047 in./tooth; axial depth–2.0"; radial depth—.060".

| Cutting fluid: | Work travel in inches |
|---|---|
| Barium sulfonate | 300 |
| Commercial fluid A (water soluble) | 144 |
| Commercial fluid D (water soluble) | 88 |

Test Run 7

Titanium B–120, aged; pocketing cut; cutting speed 88 ft./min.; feed .0047 in./tooth; axial depth—2.0"; radial depth—.030.

| Cutting fluid: | Work travel in inches |
|---|---|
| Barium sulfonate | 348 |
| Commercial fluid A (water soluble) | 126 |
| Commercial fluid D (water soluble) | 74 |

A fluid having the following composition by weight percent in straight mineral oil was prepared:

| | Percent |
|---|---|
| Formic acid | 2 |
| 50% sodium sulfonate in mineral oil | 18 |
| Water | 1.6 |

One part of this formulation was mixed with ten parts water to form an emulsion. While formic acid has been recognized as a wear reducing agent, comparison of the above described emulsion with the barium petroleum sulfonate emulsion as herein described provided the following results:

Titanium alloy B-120, standard pocketing cut .25 × 1.0, with the same cutting speeds and feeds:

| | Inches, travel |
|---|---|
| Formic acid emulsion | 130 |
| Barium sulfonate | 360 |

Thus, it is readily apparent that tool life in this case is extended nearly 300%.

Oil solutions of the barium petroleum sulfonate product in concentrations of 10% to 40% by volume in pale oil provide outstanding characteristics compared to standard oil base cutting fluids, and particularly for machining of titanium.

Water and oil emulsions and oil solutions of the sulfonates of calcium, magnesium and aluminum have been prepared and tested with results essentially the same as those indicated above with respect to barium sulfonate.

The above results are believed clearly indicative of the superiority of the cutting fluids made in accordance with the present invention. Note in particular that the barium sulfonate is consistently superior for the varying cutting conditions of the illustrated test runs, whereas, with respect to the standard fluids, with minor exceptions, it would be necessary to use a different fluid for each run to obtain the best cutting characteristics. While the comparisons are based on the water soluble solutions, evaluations as to the oil based cutting fluids are likewise superior, but not as extreme as in the water soluble solutions.

While the reasons for the unusual characteristics of the cutting fluids prepared according to the invention are not clearly understood, it is believed that the mechanism is physical in nature rather than chemical. This belief is substantiated by the fact that the metallic sulfonate must be replenished occasionally, dependent on the extent of use, whereas the emulsifier (sodium petroleum sulfonate) and other ingredients are unaffected except through normal loss such as by being carried away on the chips.

In this connection, it is believed that a very thin film of barium (or other metal) is formed on the titanium during the cutting operation, thereby acting as a soft metal lubricant. To confirm this belief titanium chips, resulting from a machining operation utilizing the invention, were immersed in a saturated saline (NaCl) solution. It was thought that, if barium is in fact present on the cut side of the chip, since barium is higher in the electrochemical series than titanium, a galvanic cell would be formed when the chips were immersed in the electrolyte. Barium, being anodic to titanium, would protect the titanium against corrosion. After 17 days in the saline solution the titanium showed no signs of deterioration.

While specific embodiments of the invention have been shown and described, it should be understood that certain alterations, modifications and substitutions may be made to the instant disclosure without departing from the spirit and scope of the invention as defined by the appended claims.

What is claimed is:

1. A cutting fluid for titanium and its alloys consisting essentially of an emulsion of about 90% by volume of water and 10% by volume of a mixture of
   (a) five to twenty parts by volume of an oil solution of an oil soluble metal petroleum sulfonate selected from the group consisting of barium, calcium, magnesium and aluminum sulfonates, the concentration of the metal petroleum sulfonate by weight in oil is for barium about 44% and for calcium, magnesium and aluminum about 55%,
   (b) twenty parts by volume of an alkali metal petroleum sulfonate emulsifier,
   (c) one part by volume of a glycol coupler, and
   (d) fifty-nine to seventy-four parts by volume of a neutral blending oil.

2. A cutting fluid as defined in claim 1, wherein the concentration of the metal petroleum sulfonate by weight in the emulsion varies from about .2% to 1%.

3. A method for machining titanium and its alloys which comprises using as the cutting fluid in the machining operation a composition consisting essentially of about 5% to 40% by volume of an oil solution of an oil soluble metal petroleum sulfonate selected from the group consisting of barium, calcium, magnesium and aluminum sulfonates, wherein the concentration of the metal petroleum sulfonate by weight in the oil solution is for barium about 44% and for calcium, magnesium, and aluminum about 55%, and about 60% to 95% by volume of neutral blending oil.

References Cited

UNITED STATES PATENTS

| 2,814,594 | 11/1957 | Smith | 252—33 X |
| 2,361,476 | 10/1944 | Higbee et al. | 252—33 |
| 2,367,435 | 1/1945 | Reudrich | 252—33 |
| 2,395,713 | 2/1946 | Barbour | 252—33 X |
| 2,638,445 | 5/1943 | Young et al. | 252—33 |
| 3,039,960 | 6/1962 | Bennett | 252—49.5 X |
| 3,050,464 | 8/1962 | Brown et al. | 252—33 |
| 3,088,914 | 5/1963 | Holzinger | 252—49.5 X |
| 3,098,821 | 7/1963 | Faust et al. | 252—49.5 X |

FOREIGN PATENTS

| 735,711 | 8/1955 | Great Britain. |

DANIEL E. WYMAN, *Primary Examiner.*

PATRICK P. GARVIN, *Examiner.*